US006332984B1

(12) United States Patent
Boyd et al.

(10) Patent No.: US 6,332,984 B1
(45) Date of Patent: Dec. 25, 2001

(54) INTEGRATED DIVERTER AND WASTE COMMINUTOR

(75) Inventors: Ramon E. Boyd, Huntington Beach; Armando I. Chacon, Santa Ana; Ronald A. Duecker, Orange; Craig J. Fennessy, Huntington Beach; Winslow P. Freeman, Jr., Long Beach; Rodney E. Graham, Tustin; Robert T. Sabol, Aliso Viejo; Enrique Santiago, Santa Ana, all of CA (US)

(73) Assignee: Chambers, Boyd and Associates, Santa Ana, CA (US)

( * ) Notice: Subject to any disclaimer, the term of this patent is extended or adjusted under 35 U.S.C. 154(b) by 0 days.

(21) Appl. No.: 09/576,345

(22) Filed: May 22, 2000

Related U.S. Application Data

(62) Division of application No. 09/160,180, filed on Sep. 25, 1998, now Pat. No. 6,176,443.

(51) Int. Cl.[7] .......... B01D 29/48
(52) U.S. Cl. .......... 210/497.1; 209/303; 210/784; 210/174; 241/280; 241/DIG. 38
(58) Field of Search .......... 209/664, 666, 209/669, 156, 208, 210, 270, 305, 362, 379, 385, 389, 132, 155; 210/152, 447, 497.1, 494.1, 494.2; 241/70, 87, 280, DIG. 38

(56) References Cited

U.S. PATENT DOCUMENTS

| | | | |
|---|---|---|---|
| 2,106,851 | 2/1938 | Nordell | 210/152 |
| 2,163,977 | 7/1939 | Ferry | 146/194 |
| 2,199,729 | 5/1940 | Peterson | 83/11 |
| 2,342,927 | 2/1944 | Durdin, Jr | 210/152 |
| 2,614,695 | * 10/1952 | Nordell | 210/152 |
| 2,672,985 | 3/1954 | Nordell | 210/152 |
| 2,933,189 | 4/1960 | Jellesma | 210/174 |

(List continued on next page.)

FOREIGN PATENT DOCUMENTS

| | | | |
|---|---|---|---|
| 298514 | 7/1954 | (CH) . | |
| 512177 | 11/1992 | (EP) | B02C/18/40 |

OTHER PUBLICATIONS

Brochure entitled, "Dimminutor—Specifications and Dimensions", date unknown, 1 page.

Instruction manual for Type "A" Barminutor Screening and Comminuting Machine, Chicago Pump, date unknown, 20 pages.

Brochure for Ecodyne Comminutors, date unknown, 2 pages

Brochure for Chicago Pump Comminutor, date unknown, 3 pages.

(List continued on next page.)

*Primary Examiner*—Donald P. Walsh
*Assistant Examiner*—Mark J. Beauchaine
(74) *Attorney, Agent, or Firm*—Sughrue Mion, PLLC

(57) ABSTRACT

An integrated system for diverting and reducing the size of waste materials in an effluent stream comprising a frame having a bottom housing and a top housing and mountable in the stream. A grinder unit is mounted to the frame bottom housing and comprises a cutter assembly positioned in the stream and a drive mechanism coupled to the cutter assembly to rotate the cutter assembly. The drive mechanism may be electric or hydraulic. A diverter unit is mounted to the frame. It may be a single diverter or dual diverters. The diverter unit comprises a cylindrical drum rotating on a stub shaft. It may also be a helical coil. A drive assembly operably couples the drive mechanism to the drum shaft to rotate the cylindrical drum as the cutter assembly rotates. In operation the diverter unit is positioned side by side to the grinder unit to diverts solids in the effluent stream toward the grinder unit for size reduction. Side rails are employed for flow control around both the diverter unit and the grinder unit.

5 Claims, 7 Drawing Sheets

U.S. PATENT DOCUMENTS

| | | | | |
|---|---|---|---|---|
| 3,188,942 | | 6/1965 | Wandel | 100/72 |
| 3,700,106 | | 10/1972 | Wittke | 210/174 |
| 4,009,109 | * | 2/1977 | Tullier et al. | 210/447 |
| 4,147,634 | | 4/1979 | Wegener | 210/396 |
| 4,702,422 | | 10/1987 | Chambers, Sr. et al. | 241/46.06 |
| 4,762,281 | | 8/1988 | Eberhardt | 241/46.06 |
| 4,919,346 | | 4/1990 | Chambers, Sr. | 241/46.02 |
| 5,060,872 | | 10/1991 | Chambers, Sr. | 241/46.02 |
| 5,061,380 | | 10/1991 | Stevenson | 210/768 |
| 5,158,239 | | 10/1992 | Vock et al. | 241/172 |
| 5,333,801 | | 8/1994 | Chambers, Sr. et al. | 241/46.02 |
| 5,478,020 | | 12/1995 | Chambers, Sr. et al. | 241/236 |
| 5,505,388 | | 4/1996 | Chambers et al. | 241/46.02 |
| 5,593,100 | | 1/1997 | Chambers, Sr. et al. | 241/101.2 |
| 5,833,152 | * | 11/1998 | Galanty | 241/46.02 |

OTHER PUBLICATIONS

Brochure for Epco Comminutor, date unknown, 4 pages.

Brochure for TLB Corporation entitled, "Comminutors—Treatment Plants, Lift Stations, Boost Systems", date unknown, 2 pages.

Brochure entitled, "Dimminutor—Open Channel Comminutor", date unknown, 3 pages.

Brochure for Robbins Myers entitled, "MOYNO Pipeliner—Effective Solution to Tough Conditioning Problems", date unknown, 2 pages.

Brochure entitled, "FALLOVA Shredder Co., Inc.", date unknown, 3 pages.

Pankratz, Tom M., "Screening Equipment Handbook", *Technomic Publishing Co., Inc.*, 1995, Chapters 8 & 9, one misc. page, and pp. 178–179.

* cited by examiner

INTEGRATED DIVERTER AND WASTE COMMINUTOR

CROSS REFERENCE TO OTHER PATENTS

This is a divisional of application Ser. No. 09/160,180 filed Sep. 25, 1998 issued as U.S. Pat. No. 6,176,443 B1, Jan. 23, 2001, the disclosure of which is incorporated herein by reference.

This invention is related to commonly assigned U.S. Pat. Nos. 478,020, 5,505,388 and 5,593,100.

BACKGROUND OF THE INVENTION

PRIOR ART

This invention relates to the combination of a solid waste comminuting apparatus and a screening system to divert solid matter contained in an influent stream to the comminutor for purposes of size reduction. Prior screening/comminuting systems are disclosed in U.S. Pat. No. 5,505,388, incorporated here by reference. As set forth in the '388 patent, as is well known in waste water treatment, there are many environments where large volumes of liquid require initial processing for purposes of coarse screening so that large solid objects are diverted in the influent stream and their size reduced by a grinding unit. The material, now of a reduced size, is either removed at the point of reduction or re-introduced into the stream for further processing downstream.

This invention is an improvement over the technology disclosed in U.S. Pat. No. 5,505,388. The '388 patent and the commercial technology stemming from it represented a significant improvement over prior vertically oriented bar screens which were typically used in waste water treatment plants for the purposes of removing solids from a liquid flow. Those prior devices thus utilized rakes, or the like which moved at an angle generally vertical, and therefore perpendicular to the fluid flow in a vertical plane. This resulted in undesirable hydrostatic effects in addition to a propensity of such systems to clog, when fine screens are used, and require a considerable amount of power for purposes of lifting solid materials.

The '388 technology departed from this prior technique by integrating into a common housing a diverter unit, for example a rotating drum placed directly in the fluid flow with an adjacent comminutor disposed in that flow to receive solids that were diverted by the drum. The drum and the comminutor were commonly powered. Consequently, the drum allowed fluid to pass through it but at the same time presented a barrier for solid matter that could not pass through the screening elements. The solid matter was then diverted to one side of the fluid flow where it was then ground into smaller particles and then those particles remain in the stream for substantive downstream processing.

A variant of this basic technique of diverting solids in the stream used double drums, one placed on each side of the comminutor. This system is particularly effective for wide flow channels. By this technique, flow rates are maintained in the stream but, solids are efficiently diverted toward the comminutor for size reduction.

These systems have been commercially successful and as a result of that success a number of areas of further improvement have been identified. One area of improvement is in the drive system for the comminutor and the drum. For example it is desirable to incorporate the capability to tighten the stack of the comminutor from the top as disclosed in U.S. Pat. No. 5,478,020. However since the screen assembly and the drive train are located in the top end housing of integrated systems, top stack tightening was not considered to be feasible. Additionally in prior systems rags could wrap around the lowest cutters and combined with grit would degrade the casting material of the end housing. The result was an expensive repair for the entire end housing.

Another area of improvement deals with the diverter and the manner of support. The diverter, typically a drum, employed a side rail on one side to improve flow characteristics and provide structural support. To maintain overall rigidity of the system additional components were required. This was a face plate attached to top and bottom end housings to complete the frame with the side rail. As a part of the frame prior designs used a face plate bolted to the front of the device which served as structure extending the width of the unit. This framing served to mount the overall frame in a sewage channel when it was lowered and secured to a fixed metal structure fastened to opposing walls of the channel. As can be appreciated the face plate is a fixed dimension and mounting was thus a function of channel width and the need to size the framework to match.

Prior designs used a drum having a center shaft running vertically the length of the drum. Small particles of rags and other solids in the waste stream entering the interior of the drum through screen apertures could wrap on the center shaft. Eventually this buildup on the shaft would increase, enlarging in diameter and caused an internal blockage. In turn a loss of flow through the screen could result decreasing the efficiency of the screen.

Previous drum configurations used intermediate sprockets to support the drum in a spatial arrangement along the central shaft of the drum. Any portion of the screen between the sprockets was unsupported except by the interconnection of the screen material itself. This lack of support caused an hour glass effect between the interface of the screen and the grinder. That is the outer surface of the screen parallel to the axis of rotation would not be in alignment causing gaps at the interface with the grinder.

Prior screening systems, for example those described in U.S. Pat. No. 4,919,346 used an internal deflector. This was possible since the diverter was a screen, elongated with two interior shafts. However, in the context of a rotating drum of the type in the '388 patent such internal deflectors could not be incorporated because the diverter was configured around sprockets containing spokes.

SUMMARY OF THE INVENTION

Given the desire to improve the state of the art in the screening and size reduction of solids in a fluid stream it is an object of this invention to provide an integrated diverter and grinder unit that has improved construction yet is easily maintained.

It is yet another object of this invention to provide an intergrated diverter and grinder unit which has improved flow characteristics using an internal deflector and side rails.

A further object of this invention is to provide a combined diverter and grinder unit which has an improved screen configuration that improves flow yet efficiently diverts solids to the grinder.

These and other objects of this invention are accomplished by means of an integrated system which utilizes a common mounting structure for both the diverter and the grinding unit including an integral vertical guide rail to facilitate mounting in the waste water channel.

A wear plate is provided for the bottom end housing that bolts on and protects the main end housing casting.

Preferably the diverter is in the form of a cylinder that is shaftless within the cavity of the drum. Vertical ribs of the drum which attach top intermediate and bottom sprockets extend inwardly towards the interior of the drum. The ribs form and assist in the removal of solids from the face of the drum.

In one preferred embodiment of the drum a continuous coil is used in an helical or "slinky" type of configuration. This type of drum, also a centerless shaft configuration, permits a higher percentage of open area to enhance flow capabilities through the device.

The drum is positioned so that its outer circumferential surface is substantially tangential to a circle drawn to circumscribe the elements of an adjacent cutter blade assembly. The screen may be placed at either the right or the left of the grinder unit. Alternatively, a pair of diverters can be employed with the grinder unit positioned in the center, with both diverters driven by a common drive source off the grinding unit. The drive system utilizes stub shafts at top and bottom to facilitate removal of the drum without disassembly of the unit.

This invention will be described in greater detail by referring to the drawings and the description of the preferred embodiments which follows.

BRIEF DESCRIPTION OF THE DRAWINGS

FIG. 4 is a cutaway perspective view of a second preferred embodiment of this invention utilizing a pair of rotating diverter elements with a grinder unit centered there between;

DESCRIPTION OF THE PREFERRED EMBODIMENTS

Figure 1:
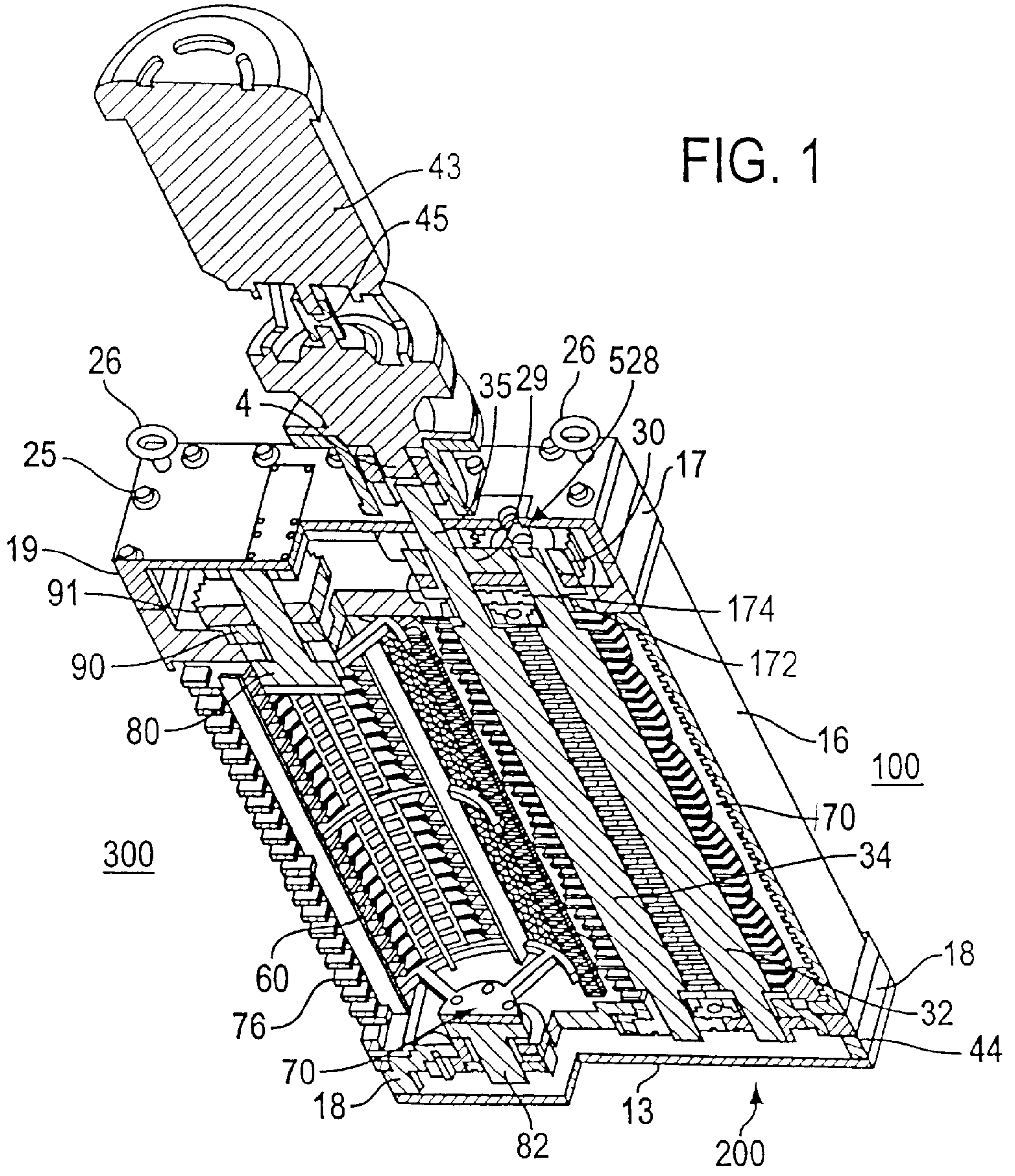
FIG. 1 is a cutaway perspective view of a first preferred embodiment of this invention.
Figure 2:
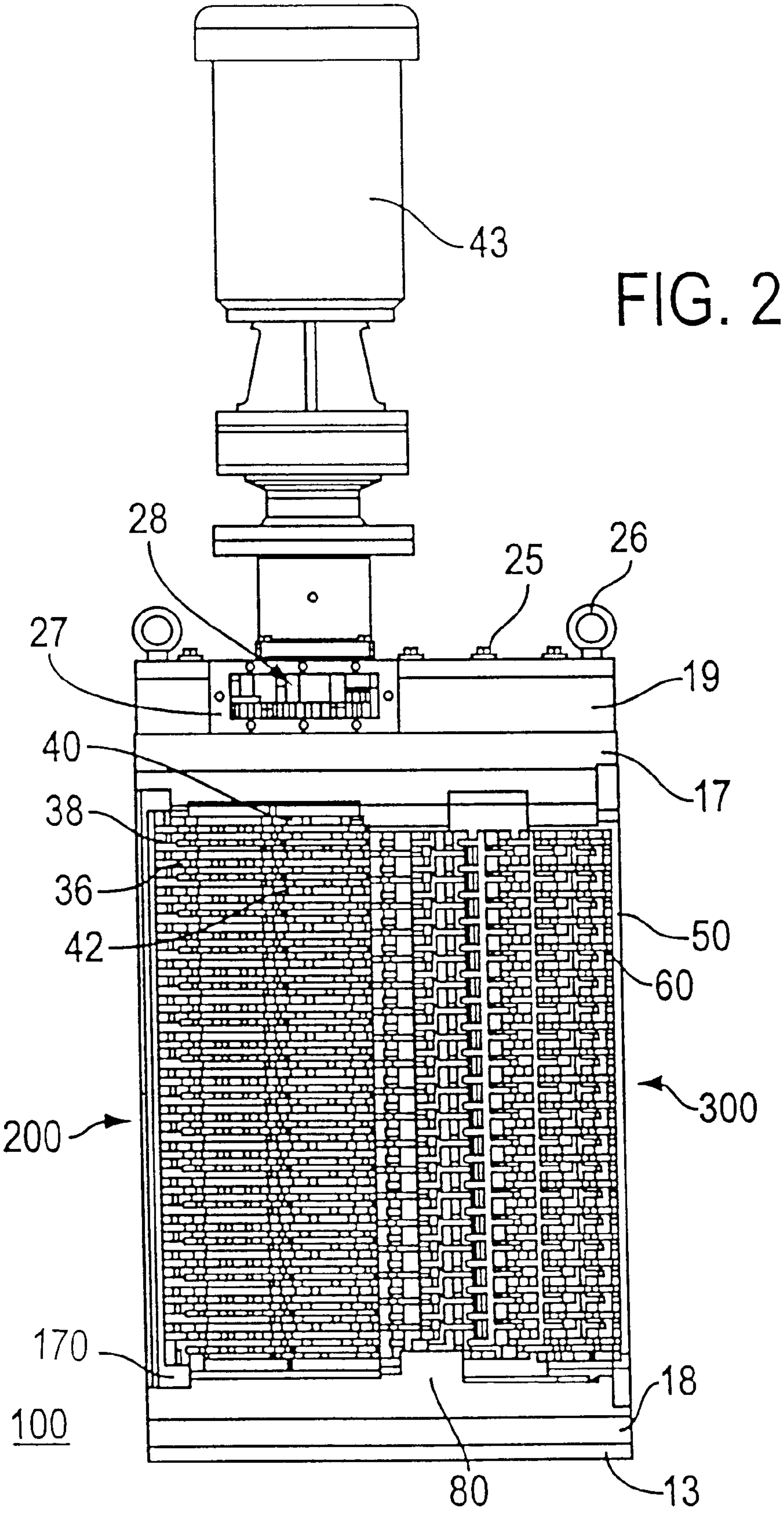
FIG. 2 is a back view illustrating the essential components of the first preferred embodiment and the provision for top stack tightening.
Figure 3:
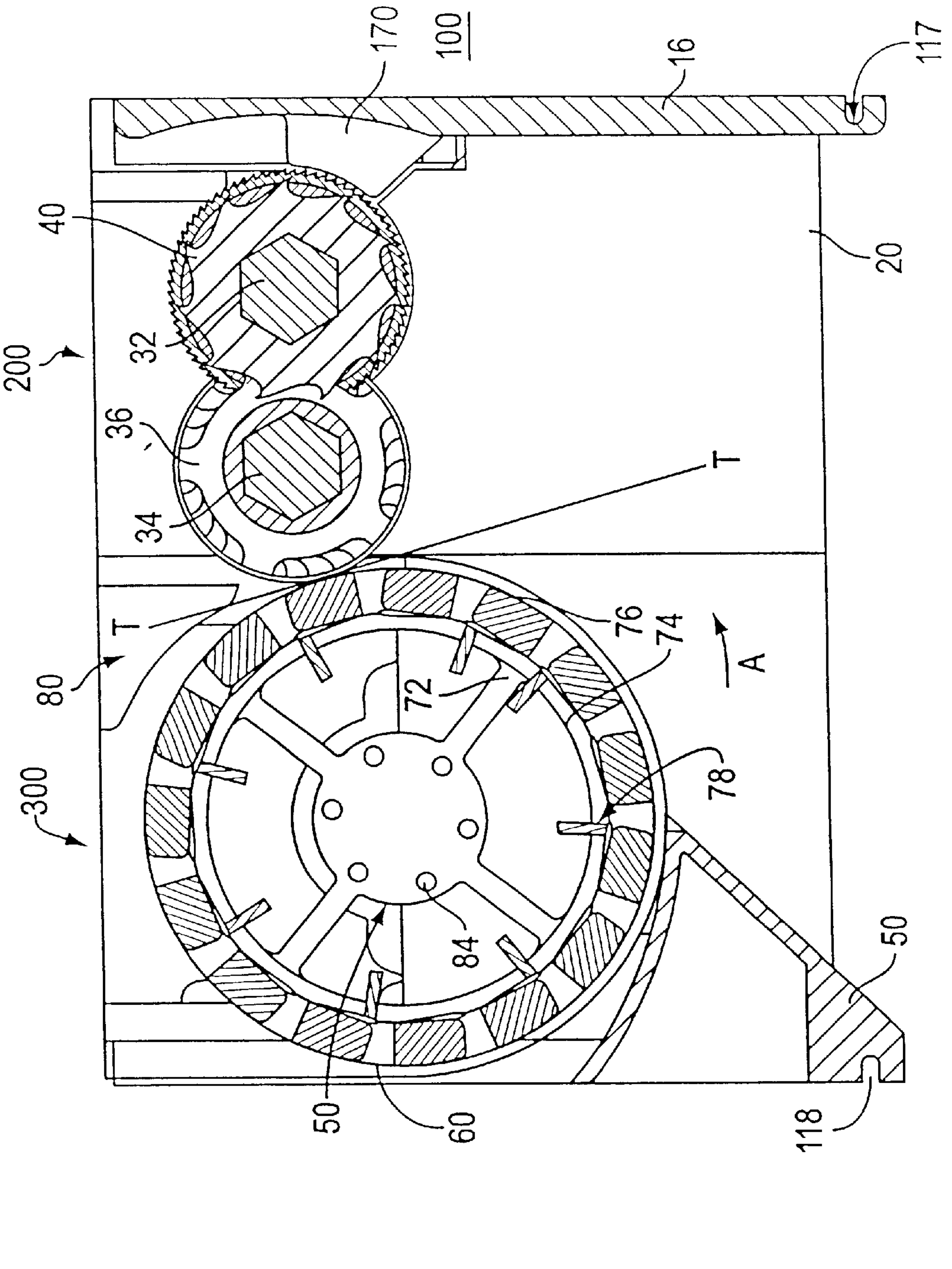
FIG. 3 is a top view illustrating the alignment of the grinder unit with the diverter element of the first preferred embodiment and the provisions for side rail flow control.

Referring now to FIGS. 1, 2, and 3 a first preferred embodiment of this invention will be described. This first preferred embodiment comprises three major subcomponents which are integrated together to form a unitary system. These are the frame element 100, the grinder element 200 and a single rotating screen 300. Referring now to FIGS. 1 and 2, the frame comprises a top cover 19 and a bottom cover 13. An end housing 17 is associated with the top cover and an end housing 18 is associated with the bottom cover 13. The top cover 19 is affixed to the end housing 17 by means of a series of fasteners 25. Similarly, the bottom cover 13 is coupled to the end housing 18 by means of appropriate fixing elements, not illustrated. Lifting rings 26 are provided to raise and lower the unit into position.

A side rail 16 on the grinder side and the side rail 50 for the drum each have vertical grooves 117, 118 running top to bottom of each end housing (See FIG. 3). These form integral alignment paths to permit the unit to be lowered or raised. The grooves are fashioned to permit a compatible flange from a fixed structural element mounted to the wall of the sewage channel to serve as a guide.

A wear plate 20 (See FIG. 3) bolts on to the bottom end housing 18. This wear plate is replaceable and protects the bottom end housing casting 18. In prior systems grit and the like would degrade the casting material forming the lower end housing casting. Also, debris tended to accumulate around the lowest cutters in the stack requiring occasional replacement of the bottom end housing. By the use of a sacrificial plate this problem is eliminated.

In accordance with this invention an access port 27 is provided in the top housing to provide access to the top nut 28. A cover plate, not illustrated, is removable. As illustrated in FIGS. 1 and 2 a gear train 29, 30 transmits the output of the power source 43 to the grinder unit 200. In this invention, grinder shafts 32, 34 permit top shaft tightening. This is accomplished by means of locking the nut 28 of shaft 34 through access port 27 and applying torque to the screw 528 (FIG. 1) of shaft 32. This eliminates the need to dissemble components or remove the unit for tightening at the bottom as was the past practice. It eliminates the need to disassemble components or remove the unit for tightening at the bottom as in the prior art.

The grinder unit comprises a dual shaft system comprising a drive shaft 34 and a driven shaft 32. On the driven shaft 32 cutter elements 36 alternate with spacer elements 38. On the drive shaft 34 cutter elements 40 alternate with spacers 42, as illustrated in FIG. 2. The result is that at the overlapped point between the two cutter assemblies the cutter elements on one shaft interleave with the cutter elements on the other shaft because of the staggered relationship between spacer elements on the two shafts.

While the foregoing discusses rudimentary details of the grinder element which will be disclosed in greater detail here, reference is made to U.S. Pat. No. 4,046,324 for a more complete discussion of a suitable grinder system.

In accordance with this invention improved flow control is established by the use of a number of flow guides and diverters. These improve flow around both the grinder unit and its cutting elements as well as the drum. The purpose is to maintain flow of fluid through the system while at the same time diverting solids for reduction and preventing accumulation of debris. These will now be described with reference to FIGS. 1–3.

Positioned between the two end housings 17 and 18 is a side rail 50 for drum 60. The side rail acts not only as a spacer between the top and bottom end housings but also as a baffle to guide solids toward the diverter and prevent them from passing around the outside of the drum. This side rail 50 also supports both the top and bottom housings 17 and 18 since the drive and driven cutter shafts 32, 34 are not centered front to back in the frame.

Another side rail 170 is used in conjunction with the grinder unit. This side rail is slotted and also runs top to bottom and provides support on the grinder side of the frame. This side rail promotes flow around the cutting elements on the stack mounted on shaft 32.

Flow through the cutting unit is improved by purposes of channeling fluid direction in a manner generally parallel to the cutter elements. This is accomplished by slotting the side rail to have a series of parallel flow paths extending in a spaced but staggered arrangement relative to the adjacent cutter stack on shaft 32.

A low flow solids diverter 80 is positioned as a part of the bottom end housing 18. This diverter is positioned on the downstream side of the frame at the interface of the grinding unit 200 and the drum unit 300. The purpose of this diverter is to prevent solids that have exited the grinder unit from bypassing a downstream device such as an auger attached to the frame.

The diverter 60 comprises a drum that is shaftless within the interior of the drum. This is illustrated in FIG. 1. Prior systems employed a central shaft running vertically the length of the drum. As a result debris such as small rags and the like would enter the interior of the drum and wrap and accumulate around the shaft. Over time they would build up and reduce flow through the screen thereby reducing efficiency.

In accordance with this invention the diverter employs a shaftless configuration. It uses top and bottom hub sprockets 70 having radial spokes 72 coupled to an inner peripheral ring 74 of the drum 60. An intermediate sprocket not illustrated is also used. It will be apparent that the spokes 72 are aligned with the flow path as opposed to be placed perpendicular to it. The diverter itself has a grid with openings and series of screen segments 76. As illustrated in FIG. 3, the drum 60 rotates counterclockwise, toward the grinder unit as indicated by the arrow A. The leading edge of the diverter elements is tapered to facilitate diversion of solids toward the grinder without having them adhere into an opening. Given this tapering the screen tends to be self cleaning.

Additionally a series of vertically extending ribs 78 act as internal deflectors. These ribs of the drum assembly attach to the top bottom and intermediate sprockets 70 and extend inwardly towards the interior of the diverter 60. While illustrated as straight they may also be curved. Their purpose is to assist in the removal of solids from the surface of the screen by hydraulic action tending to force the material outward to the front surface of the diverter. This action allows the solids to be picked up by a cutter element of the grinder unit 200. As a result, unground solids cannot pass between the diverter 60 and the grinder unit 200.

The diverter 60 can be removed for servicing without complete disassembly of the frame. The top and bottom sprockets 70 are secured to the respective stub shafts 81, 82 by bolts 84. By removal of these bolts the unit 60 may be separated from the drive assembly for servicing.

Figure 6:
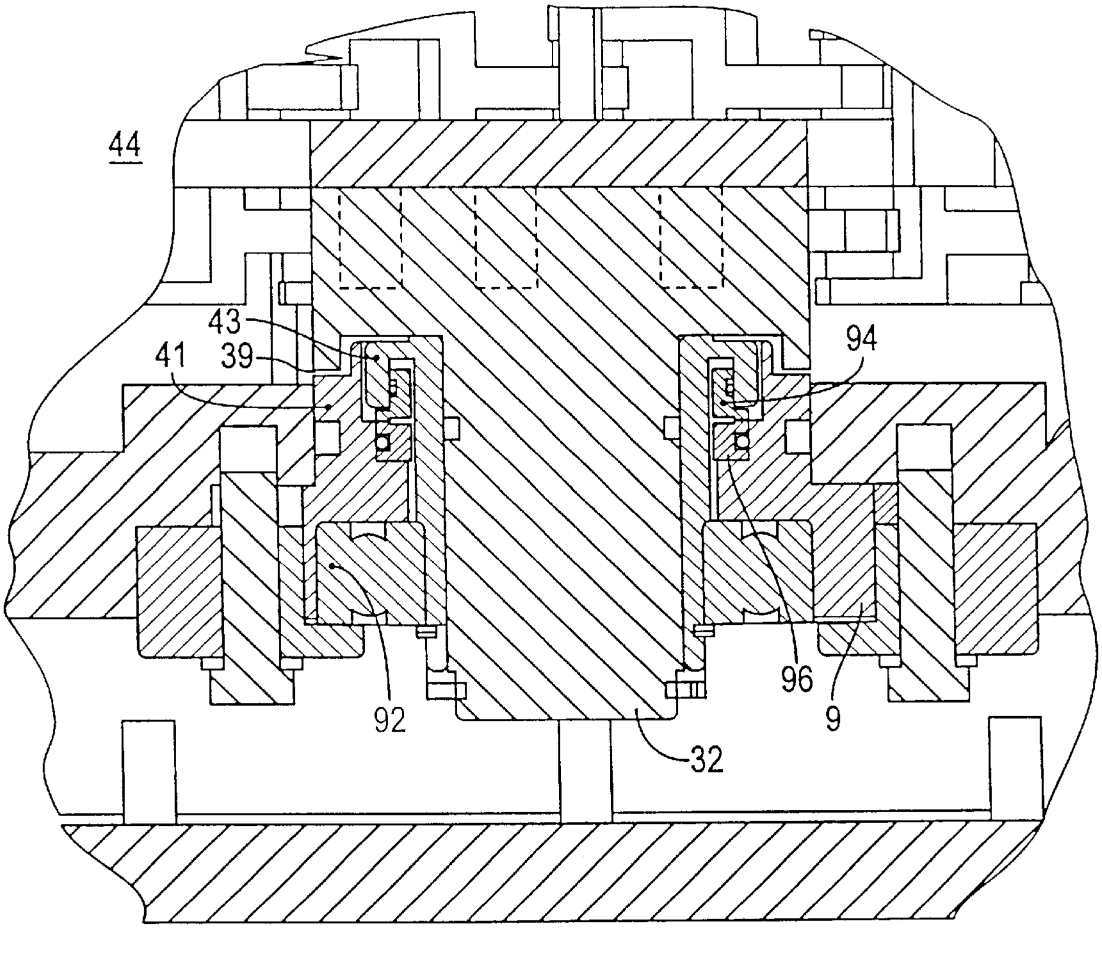
FIG. 6 is a sectional view illustrating the seal configuration of this invention.

The cutter assembly is journaled for rotation in the bottom end housing by means of a seal-bearing assembly 44 as illustrated in FIG. 6. In this invention stack tightening occurs at the top of the stack. During initial assembly a snap ring fixes the shafts 32 and 34 into position. The seal assembly 44 may be a separately removable cartridge having, as a replaceable unit, bearings, stator and rotating race assemblies together with associated internal O-ring assemblies. This seal bearing assembly may be of the type disclosed in U.S. Pat. No. 5,593,100, incorporated herein by reference. It may also be a fixed seal and bearing assembly.

In accordance with this invention a groove 39 forms a tortuous path within the cartridge itself. This path 39 extends between the bearing cartridge 41 and the insert cartridge 43. This differs from prior configurations where the tortuous path was formed between the housing and a compression disk.

As disclosed in the '100 patent, the bearing assembly has a cartridge housing 92, a dynamic race 94 and a static race 96. A bearing assembly 98 is an integral part of the structure. Further details are set forth in the '100 patent.

At the upper end of the frame 100, the side rail 70 for the grinder unit is fixed into position by means of locking elements. Shafts 32 and 34 are held relative to the top end housing 17 by means of clamping elements and an upper seal assembly 172, 174. A drive shaft 4 is coupled to a motor 43 by means of a coupling 436. The motor 43 is illustrated in FIG. 1 as an electric motor. However, the motor may be hydraulic. Thus in this embodiment, as in the case of this invention, the choice of motor drive for the system is not significant.

The drive shaft 34 has mounted to it a pinion 35, which in turn drives the gear 30 mounted on the driven shaft 32. The drive shaft 34 also is used to drive the screen 60.

The rotating diverter 60 is mounted on a stub shaft 81. The shaft is journaled for rotation by a bearing assembly 90 held in place by a retaining ring.

The diverter drum utilizes a gear drive employing a driven shaft 81 having mounted thereon a gear 91. An intermediate gear is employed so that for each rotation of the driven shaft 32 there is corresponding rotation of the diverter 60. As appropriate, the housings are gasketed by means of top gasket or bottom gasket to provide the necessary resiliency and sealing between the housing members.

While this embodiment employs a gear drive, it will be appreciated that other drive mechanisms may be used such as sprockets and chain, belts and the like. The relative rotational speed of the grinder elements to that of the diverter is determined by the diameters of the drive and driven elements. This is also accomplished in the preferred embodiment by gearing arrangements, differential sprocket geometries or other well known techniques to create different rotational speeds between elements driven from a common source. It will be appreciated that it is preferable for the grinder to rotate at one speed and the diverter at another to promote the effective transfer and grinding of debris. Also, to that end the diameter of the diverter can be modified as a function of channel size to increase flow characteristics of the system.

Referring now to FIGS. 2 and 3, the relationship between the diverter 300 and the cutting elements of the grinder unit 200 are depicted. As illustrated in FIG. 3 the outer circumference of the diverter 60 defines a circle of a drum. Likewise, the outer circumferential points of the cutter elements of each of the cutters 36 defines a circle. The tangent common to those two circles is illustrated by the line T—T in FIG. 3. Consequently, in mounting the diverter assembly 300, relative to the cutter assembly 200, this geometric orientation is satisfied by mounting those elements on a frame element 100. The orientation is illustrated in FIG. 3 such the grinder and the diverter have a generally side by side orientation relative to the fluid stream. The position of the low flow diverter with respect to the tangent line T—T is illustrated in FIG. 3.

Figure 4:
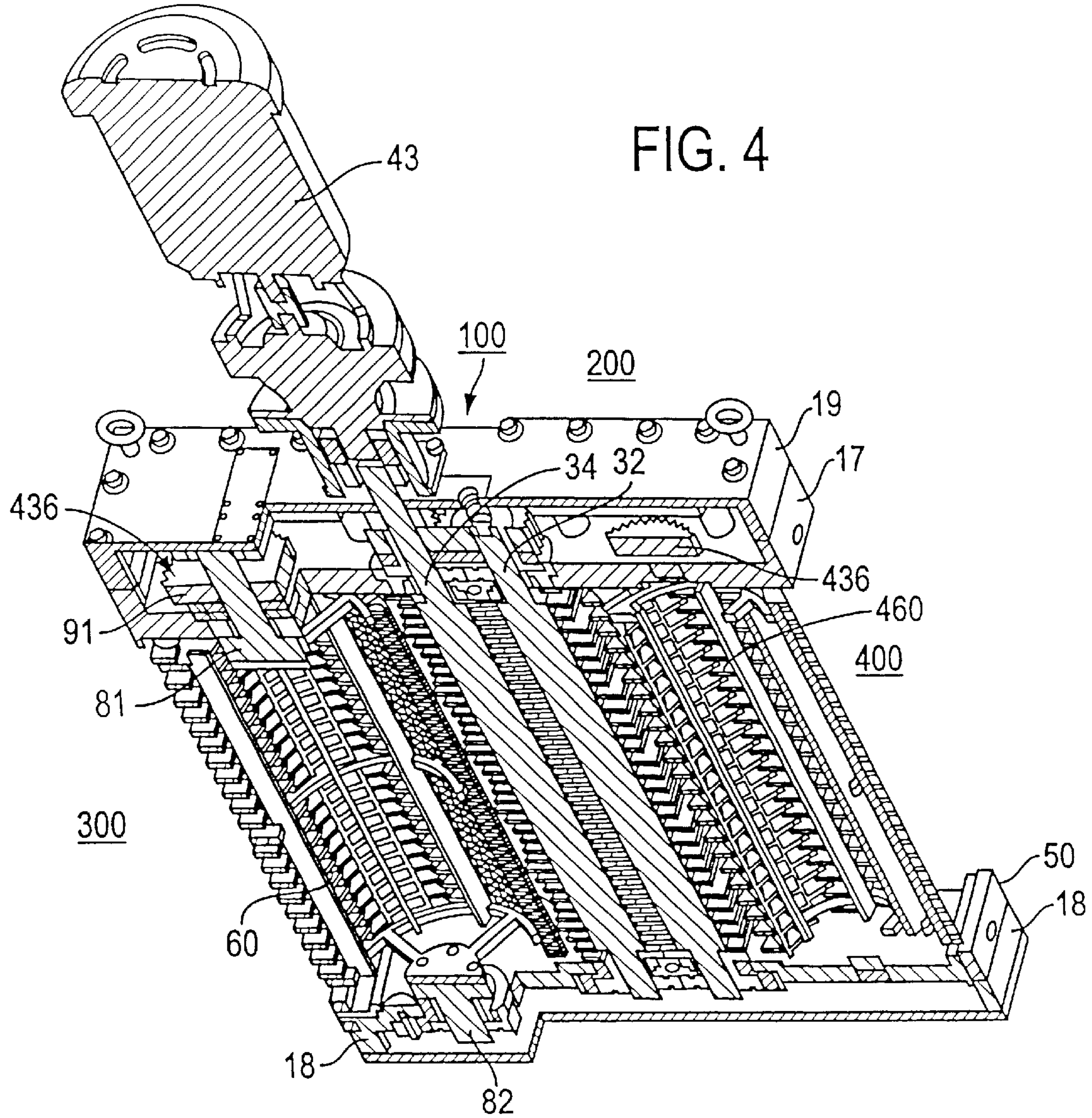
Figure 5:
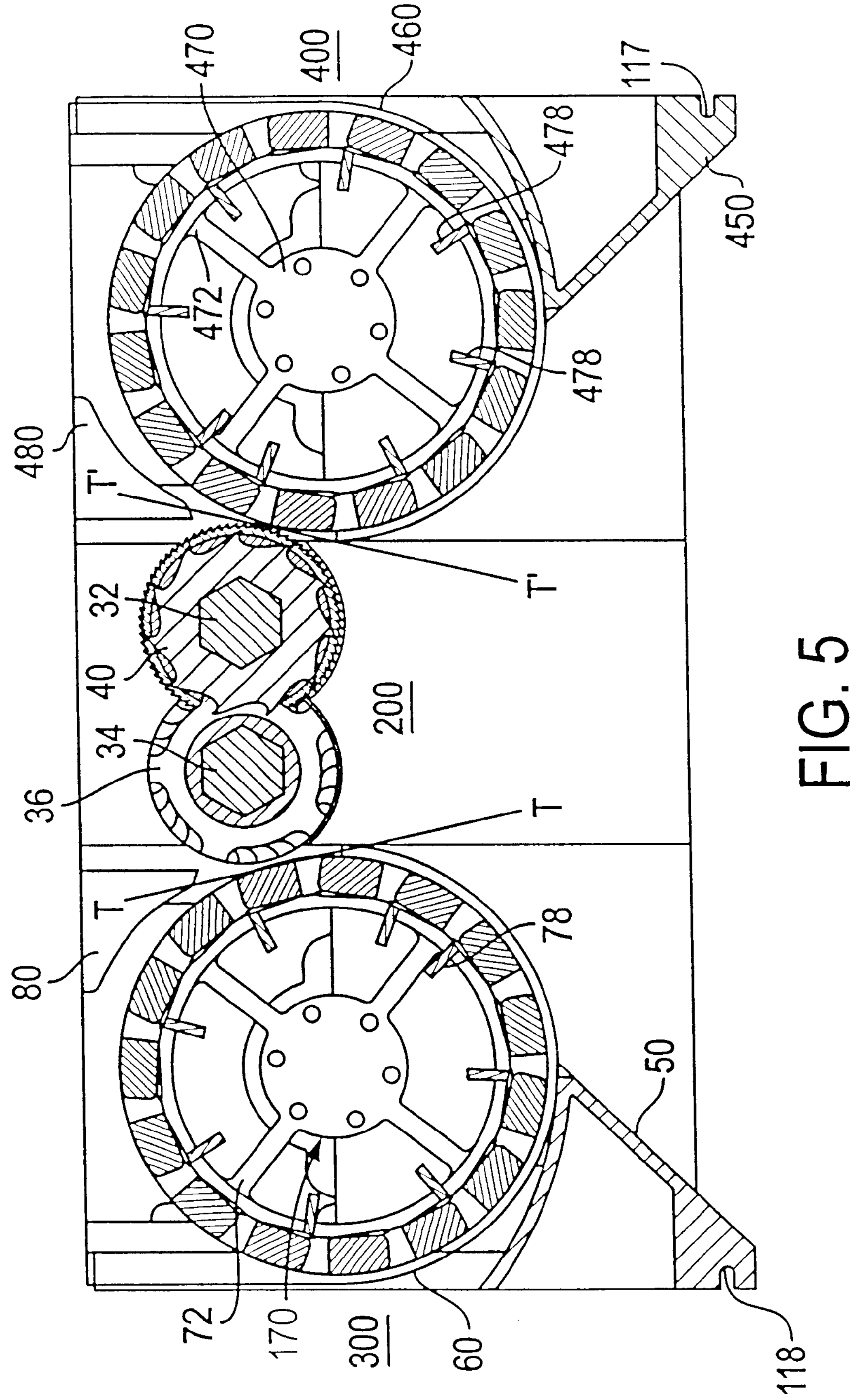
FIG. 5 is a top view of the second preferred embodiment of this invention illustrating flow control.

Referring now to FIGS. 4 and 5 a second preferred embodiment of this invention is depicted. In the first preferred embodiment a single rotating screen unit is illustrated. While illustrating a "left hand model" in FIG. 2, that is, with the screen placed to the left of the cutter assembly, it is obvious that the system could be reversed having a "right handed model". The embodiment of FIGS. 4 and 5 provides a pair of rotating diverter assemblies 300 and 400 together with a centrally disposed cutter unit 200. FIG. 4 illustrates the components housed in a common frame 100. To the extent like elements are depicted in this embodiment, the same numbering is used as with the first preferred embodiment.

FIGS. 4 and 5 thus illustrate a symmetrical condition with the cutter unit 200 positioned between diverters 300 and 400. The diverters 300 and 400 are identical, driven off a centrally disposed drive shaft having the gear drives as described with respect to the first preferred embodiment. It is also noted that the tangential alignment between cutter stack and a diverter which exists with the single diverter and cutter embodiment of FIGS. 1, 2 and 3 is maintained in the dual screen unit of FIGS. 4 and 5. The two tangential lines T—T and T'—T' are illustrated in FIG. 5.

By comparing the components forming the top and bottom, end housings 17 and 18, as illustrated in FIG. 1, it can be appreciated from FIG. 4 that those same units are employed by simply having the unit completed as a second mirror image of that illustrated in FIG. 1. That is, the top housing 17 together with the top cover 19 is replicated in FIG. 4 so that it provides the necessary mounting and fixing points for the second diverter unit 400.

In both embodiments, the frame element 100 mounts directly into the waste water channel. Preferably, the waste water channel has concrete walls and the system is bolted into place. The grinding unit of the first preferred embodiment has its rigidity maintained by the use of the side rail 70 and the frame, especially the top cover 19 and the top end housing 17 which, as illustrated in FIG. 2, mounts directly to the grinder unit. In the second preferred embodiment, using a pair of diverter screens the side rail for the grinder is not required. A pair of side rails 50, one for each drum provides reinforcement. Rigidity is also accomplished by the inherent symmetry of the system. The entire system is attached to the channel frame via groove members 117 and 118. Additional structural rigidity is provided by the input side guide plates 50 and 450.

As illustrated in FIGS. 4 and 5 the drum assemblies 300 and 400 are identical. Both use the shaftless construction with hubs 70 and 470 and radial spokes 72, 472. Internal diverters 78, 478 are employed.

As is apparent from the drive elements illustrated in FIG. 1, the rotational direction of the diverter cylinder stub shaft 81 is accomplished by means of a gear that is slaved to the drive shaft 34 by means of a gear assembly. Consequently, a reversal in the direction of grinder rotation automatically reverses the direction of cylinder rotation. This is done because the units rotate via a common gear assembly.

In the case of the second preferred embodiment illustrated in FIGS. 4 and 5, the second diverter unit 400 is driven off a pinion by means of a sprocket 436. This will permit the two screens 300 and 400 to rotate in opposite directions thus diverting solids into the center of the grinding unit 200. That is, the direction of rotation of screen 300 is the same as that of the driven shaft 32 while the direction of rotation of the screen 400 will be the same as that of the drive shaft 34.

Figure 7A:
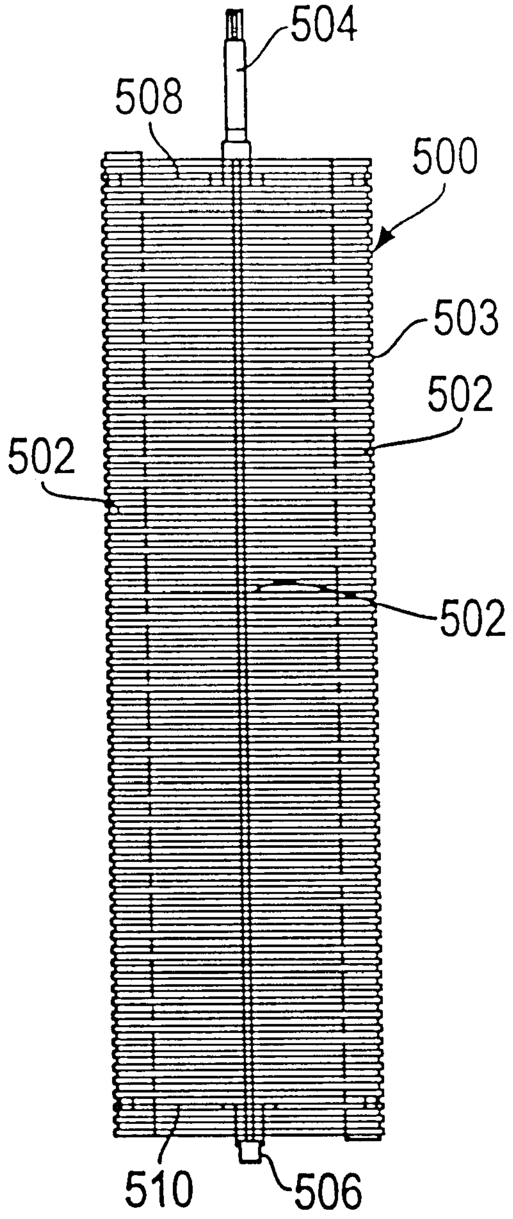
FIGS. 7A and 7B are a side view and top view respectively of a diverter unit in accordance with this invention using a helical coil drum.
Figure 7B:
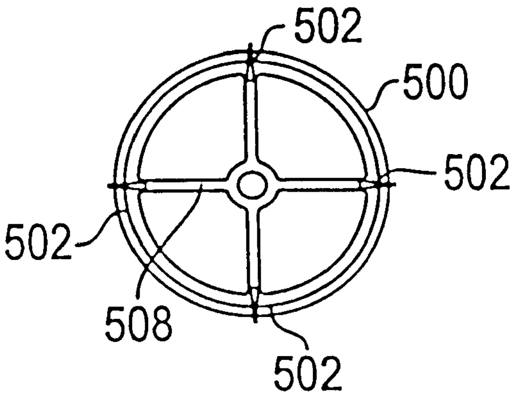

The diverter unit illustrated employs a segmented drum having discrete openings. One modification of this structure is illustrated in FIG. 7. This configuration is also centerless but employs a continuous helical coil 500. This "slinky" type configuration provides for increased open area. Additionally the pitch of the helix may be varied to suit different flow considerations such that the drum coil can be individually tailored to specific dynamic conditions. The coil 500 is supported on four vertical supports 502. Shafts 504 and 506 are used to mount the diverter to the frame for rotation. Shaft 504 is splined or otherwise formed to accept a gear. A top frame member 508 couples the supports 502 to the shaft 504. Similarly, a frame 510 couples the supports 502 to the bottom shaft 506.

While four vertical supports are illustrated it is apparent that the number is not critical. Rather, so long as rigidity for the coil is established the supports may be placed in a geometric relationship. Each support 502 has a series of notches 503. The coil is held in position by the notches at the proper spacing. The coil is typically stainless steel having sufficient strength and resiliency to mount on the supports 502 in tension. The diverter, thus constructed, is an integral unit mountable or removable as a whole.

A modification of either of the preferred embodiments can employ an auger screen positioned immediately behind the grinder. The auger screen may be positioned and be the type described and illustrated in the '388 patent. It generally comprises an elongated tapered tubular housing with the internal auger that is suitably powered by a motor. Given this positioning of the auger, entrained liquid from the grinder is returned to the flow path while the coarse materials are lifted and removed via the chute for off-line handling.

In addition to the modifications specifically delineated herein, it is apparent that other modifications may be made to this invention without departing from the scope thereof. For example, while a dual shaft grinder unit is disclosed, this invention will operate with a single shaft grinder unit. Also, the auger -screen system can be employed with the single screen embodiment.

Additionally, the device can be constructed with or without the stub shaft diverter. For example, where issues of ease of replacement are not a concern, the slinky type of diverter may be employed. Moreover, other components of this configuration, such as the improved flow control permit construction of diverter units employing the diverter drum of the '388 patent. Thus, while a complete system has been disclosed with alternate type of diverters, it will be appreciated that various other subassemblies can be employed advantageously.

We claim:

1. A drum for a solid waste diverter comprising; a helical coil and a support to mount said coil for rotation.

2. The drum of claim 1 wherein said support comprises a series of vertically extending supports to maintain spacing of said helix, frame elements for mounting said supports in a regular spaced arrangement and a pair of stub shafts mounted to said frame elements, whereby the interior of said helix is open to allow fluid to pass through.

3. The drum of claim 1 wherein said support has a series of spacer elements to maintain spacing between adjacent segments of said coil.

4. The diverter drum of claim 1, further comprising means to vary the pitch of said helical coil.

5. The diverter drum of claim 4, wherein said means to vary the pitch of said coil comprises a series spacer elements to separate adjacent segments of said helix and vary the pitch as a function of spacer height.

* * * * *

UNITED STATES PATENT AND TRADEMARK OFFICE

CERTIFICATE OF CORRECTION

PATENT NO. : 6,332,984 B1

DATED : December 25, 2001

INVENTOR(S) : Ramon Boyd, Craig Fennessy, Ron Duecker, Win Freeman, Rod Graham and Enrique Santiago It is certified that error appears in the above-identified patent and that said Letters Patent is hereby corrected as shown below:

<u>Column 6,</u>
Line 1, delete "70" and insert -- 170 --;
Line 6, delete "436" and insert -- 45 --.

Signed and Sealed this

Twenty-third Day of April, 2002

*Attest:*

JAMES E. ROGAN

*Attesting Officer* *Director of the United States Patent and Trademark Office*